United States Patent
Hui et al.

(10) Patent No.: US 7,197,668 B1
(45) Date of Patent: Mar. 27, 2007

(54) NETWORK WIDE DEBUGGING INCLUDING NODE DEBUGGING INFORMATION IN THE GAT IE OF A PNNI SIGNALING MESSAGE

(75) Inventors: Pansy Hui, San Jose, CA (US); Cheng Chia Chu, Cupertino, CA (US); ShuHung Alexander Mak, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 534 days.

(21) Appl. No.: 10/245,759

(22) Filed: Sep. 16, 2002

(51) Int. Cl.
*G06F 11/00* (2006.01)
(52) U.S. Cl. .......................................... 714/39; 714/43
(58) Field of Classification Search ................... 714/4, 714/43, 39
See application file for complete search history.

(56) References Cited

U.S. PATENT DOCUMENTS

| | | | |
|---|---|---|---|
| 6,122,753 A * | 9/2000 | Masuo et al. .................... 714/4 |
| 6,614,757 B1 * | 9/2003 | Rochberger et al. .......... 370/231 |
| 6,765,863 B1 * | 7/2004 | Wakimoto et al. ........... 370/218 |
| 6,885,634 B1 * | 4/2005 | Choudhury et al. .......... 370/217 |
| 2002/0124106 A1 * | 9/2002 | Dolganow et al. ........... 709/242 |
| 2002/0163912 A1 * | 11/2002 | Carlson ....................... 370/392 |
| 2003/0053415 A1 * | 3/2003 | Balakrishnan et al. ....... 370/229 |
| 2003/0110408 A1 * | 6/2003 | Wells et al. .................... 714/1 |

OTHER PUBLICATIONS

Protocol Dictionary, Dec. 3, 2003, Protocol Dictionary, http://web.archive.org/web/20031206201852/http://www.javvin.com/protocolPNNI.html.*
Cisco Corporation, PNNI Compliance Sepcification, 1996, http://www.cisco.com/univercd/cc/td/doc/product/wanbu/bpx8600/pnni_ses/rel1_0_1/config/oricgapa.htm#39259.*
International Telecommunication Union (ITU), ITU-T, Q.2931. B-ISDN Application Protocols for Access Signaling (Feb. 1995).
The ATM Forum Technical Committee, "ATM User-Network Interface (UNI) Signalling Specification, Version 4.0," ATM Forum document No. af-sig-0061.000 (Jul. 1996).
The ATM Forum Technical Committee, "Private Network-Network Interface Specification Version 1.0 (PNNI 1.0)," ATM Forum document No. af-pnni-0055.000 (Mar. 1996).

* cited by examiner

*Primary Examiner*—Scott Baderman
*Assistant Examiner*—Tim Bonura
(74) *Attorney, Agent, or Firm*—Blakely, Sokoloff, Taylor & Zafman LLP

(57) ABSTRACT

A method for debugging failure nodes of a network connection by providing node debugging information for a failure node in a connection failure message of a signaling protocol. The connection failure message, which indicates a failed network connection, is forwarded from the failure node to the source node of the failed connection. The node debugging information is carried in a generic application transport information element of the PNNI signaling RELEASE message, providing an efficient debugging means for network failure nodes.

27 Claims, 6 Drawing Sheets

NETWORK WIDE DEBUGGING INCLUDING NODE DEBUGGING INFORMATION IN THE GAT IE OF A PNNI SIGNALING MESSAGE

FIELD

Embodiments of the present invention relate generally to digital communications networks and more specifically to network node debugging.

BACKGROUND

A digital network is comprised of a group of switches (nodes) that are connected to each other through a variety of interfaces. Asynchronous Transfer Mode ("ATM") or "cell switching" is a technology designed for transmitting digital information such as voice, video, and data at high speeds through the digital network. The digital information is segmented into cells (fixed-length packets) and transmitted from a source node (originating node) through various intermediate nodes to a destination node. The path traversed through the network is known as a connection. Connections occasionally fail due to various causes. In a large network with many nodes, there are often multiple routes to the same destination and connection failures (and other problems) are very hard to identify and resolve.

FIG. 1 illustrates a portion of an exemplary digital network in accordance with the prior art. Network portion 100 includes a plurality of nodes A–H that are interconnected by network connections (links) 101–110. In general, the network 100 may include a variety of networks (e.g., ATM) coupling a plurality of users. A connection between users (or between particular nodes) may be established by traversing various combinations of intermediate nodes and links. For example, a connection between nodes A (e.g., source node) and node E (e.g., destination node) may be comprised of nodes B–D and links 101–105 and 111 or may be comprised of nodes F–H, and links 101 and 107–110. Additionally, nodes may be connected through multiple links as illustrated by nodes A and B, connected by links 101 and 102, and nodes D and E, connected by links 105 and 106. This increases the number of possible paths through which a connection may be established.

A particular path is dynamically selected based upon a number of different criteria so that the source node and the destination node of the connection are known, but the intermediate nodes are not known. Therefore, when a connection fails to be established, it is very difficult to determine which node generates the failure in order to effect debugging.

The network signaling protocol (e.g., Private Network to Network Interface (PNNI)) may use a number of different connection failure messages to indicate that a connection has failed. For example for a point-to-point connection a "RELEASE" or "RELEASE COMPLETE" message may be used, depending on what state the connection is in (whether a "CALL PROCEEDING" message has been sent). A "DROP-PARTY" or "ADD PARTY REJECT" message may be used for a point-to-multipoint connection.

When a connection fails (connection is released), a connection failure message is sent to the source node. The connection failure message includes a "cause code" that may explain why the connection was released. Such causes may include configuration error, software module failure, or a resource limit (e.g., node link-capacity exceeded). Many failure scenarios are possible and debugging may require a node-by-node analysis.

The ATM Forum standard "path trace" notes the path of a particular connection so that if an intermediate node releases the connection. The connection failure message then contains the path of the connection up to the failure node. Once the failure node is known, it can be examined to determine the cause of failure. The path trace is limited in that it provides only the identification of the failure node but does not provide other information needed for debugging (e.g., which software module is rejecting the connection). As such, a significant amount of debugging is still needed at the failure node to determine the cause of connection failure.

SUMMARY

A method for providing node debugging information for a failure node of a network connection is disclosed for one embodiment. Node debugging information is included in a connection failure message of a signaling protocol. The connection failure message, which indicates a failed network connection, is forwarded from the failure node to the source node of the failed connection.

Other features and advantages of embodiments of the present invention will be apparent from the accompanying drawings, and from the detailed description, that follows below.

BRIEF DESCRIPTION OF THE DRAWINGS

The proposed invention is illustrated by way of example and not limitation in the figures of the accompanying drawings, in which like references indicate similar elements and in which.

DETAILED DESCRIPTION

A method for providing node debugging information ("NDI") for a failure node of a network connection is disclosed for one embodiment. The NDI is included in a connection failure message of a signaling protocol. The connection failure message, which indicates a failed network connection, is forwarded from the failure node to the source node of the failed connection.

For one embodiment, the NDI is encoded at the failure node, and the encoded NDI is carried in a generic application transport (GAT) information element (IE) of the PNNI signaling protocol RELEASE message from the failure node to the source node. The GAT IE is an ATM Forum standard that allows network applications to carry their own organization-specific data. For one embodiment, the NDI identifies the failure node (node rejecting the connection), and includes a cause of connection failure and corrective recommendations.

Embodiments of the present invention allow a user to obtain comprehensive NDI by execution of one command to allow connection establishment or rerouting. The NDI carries module specific, detailed information and allows people with minimum system knowledge to trouble-shoot problems at a detailed level very efficiently. For example, in one embodiment, the NDI identifies the problematic software module and line of code responsible for rejecting the connection. This greatly reduces the time and effort needed to identify and resolve network problems.

An intended advantage of one embodiment of the present invention is to generate NDI at the failure node that is specific to the failure node. Another intended advantage of one embodiment of the present invention is to provide NDI to the source node through a connection failure message. Another intended advantage of one embodiment of the present invention is to provide NDI that identifies the point of connection failure, the root cause of connection failure, and any problematic software modules, and includes detailed information of the problematic software modules and recommended recovery procedures.

Figure 1:
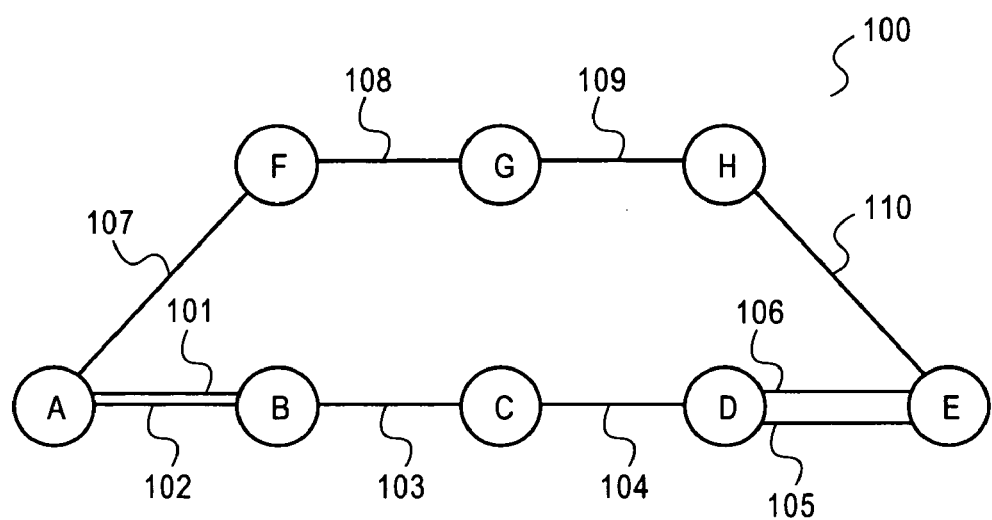
FIG. 1 illustrates a portion of an exemplary digital network in accordance with the prior art.
Figure 2:
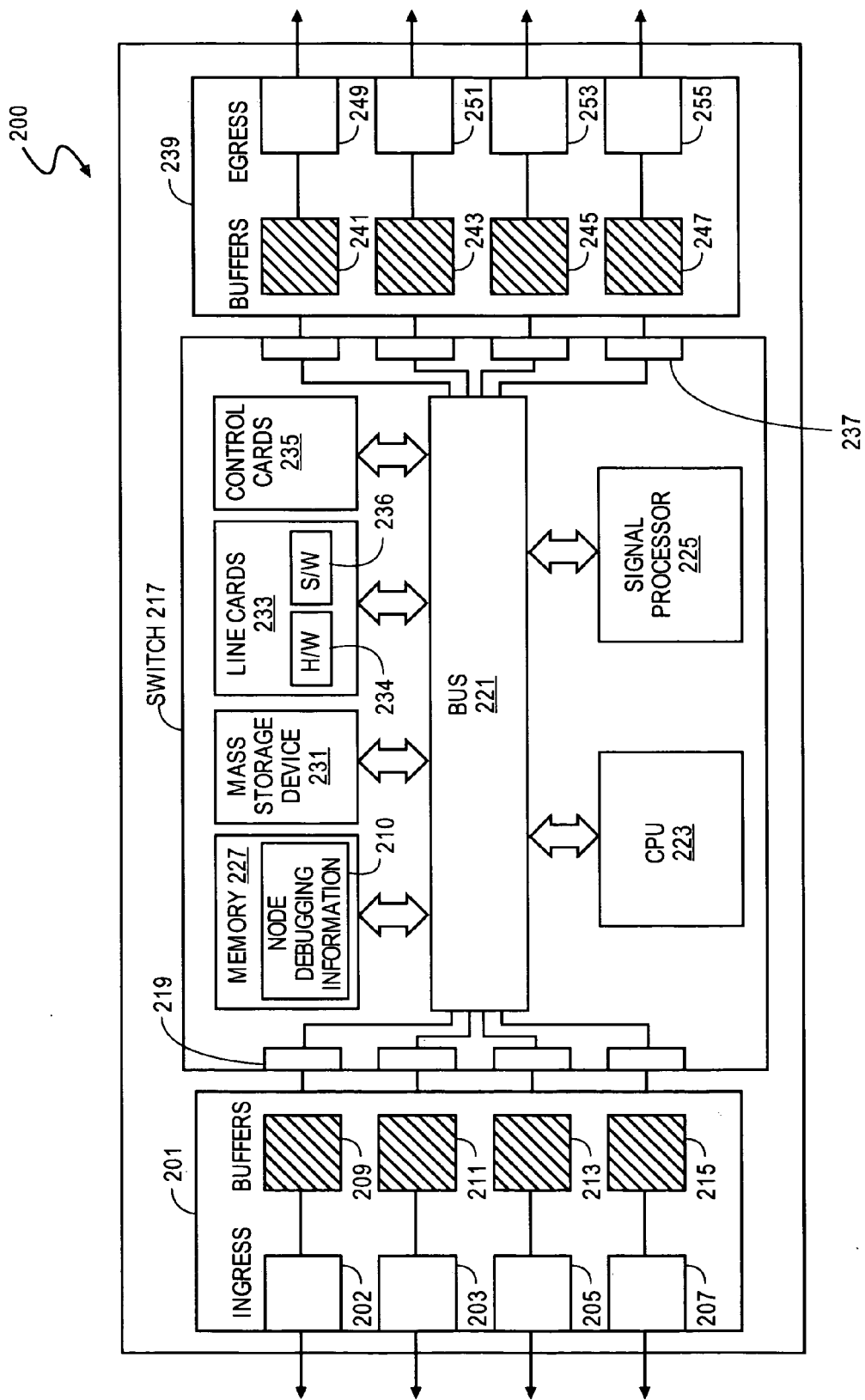
FIG. 2 illustrates an exemplary network node that may represent a source node, an intermediate node, or a destination node in accordance with one embodiment of the present invention.

FIG. 2 illustrates an exemplary network node that may represent a source node, an intermediate node, or a destination node in accordance with one embodiment of the present invention. Node 200 includes an ingress unit 201, a switch 217, and an egress unit 239. Ingress unit 201 may be coupled to input data links for receiving data from another network node via a trunk coupled to the node. Ingress unit 201 may include ingress input areas 202–207, and buffering units 209–215 coupled to the ingress areas 202–207 for buffering the received data from the input links. Ingress unit 201 may be coupled to switch 217 for transferring the buffered data to the switch 217.

Switch 217 is an ATM switch. Alternatively, other types of switches may also be used. ATM switch 217 is coupled to a variety of trunks—for example, OC48, OC12, or DS3 trunks. Switch 217 includes a digital processing system for processing data received by and to be sent by the network node. The digital processing system includes a bus 221 coupled to a plurality of input ports 219 and output ports 237, a signal processor 225, a central processing unit ("CPU") 223, a memory 227, a mass storage device 231, a plurality of line cards 233, and a plurality of control cards 235.

For one embodiment, bus 221 is a standard system bus. CPU 223 and signal processor 225 can be used to process information and/or signals for switch 217. Signal processor 225 can be used to process speech or audio information and signals for speech processing and recognition.

Memory 227 can comprise dynamic random access memory ("DRAM") static random access memory ("SRAM"), read-only memory ("ROM"), or other storage devices, for storing data or program codes used by CPU 223 or signal processor 225. For example, memory 227 may store the node debugging information 210 to be determined and processed by signal processor 225 or CPU 223. CPU 223 or signal processor 225 may execute code or instructions stored in a machine-readable medium, e.g., memory 227. The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media or flash memory devices. The code or instructions may be represented by carrier-wave signals, infrared signals, digital signals, and by other like signals.

Memory 227 may also store temporary variables or other intermediate information during execution of instructions by CPU 223 or signal processor 225. Mass storage device 231 can be a hard disk drive a floppy disk drive, an optical disk drive, or other mass storage device for storing information or instructions for the switch 217. For example, CPU 202 or signal processor 203 may execute code.

Switch 217 may contain four or more line cards 233 and several control cards 235 that control the line cards via bus 221. For one embodiment, the line cards 233 are coupled to four ports 219 and four ports 237 via bus 221. Each port may support a specific data bit rate. User traffic may be received through one line card and transmitted through another. This cross-connection is determined by a control card 235 upon the establishment of a connection. Typically, each line card also contains a hardware module 234 to accomplish bit-level and cell-level functions (such as recombining, quality of service, etc.) and a software module 236 for reprogramming hardware upon changing connections. The control cards 235 may typically run the various protocols, such as the PNNI protocol, and may contain datagrams for encapsulating resource configuration information within a user definable programmable data unit ("PDU") of a signaling protocol (e.g., the Service Specific Connection Oriented Protocol ("SSCOP")). Bus 221, CPU 223, signal processor 225, memory 227, mass storage device 231, line cards 233, and control cards 235 communicate to process PNNI packets received from input ports 219.

An egress unit 239 is coupled to switch 217. Egress unit 239 includes a series of buffers 241, 243, 245, and 247 coupled to a series of egress areas 249, 251, 253, and 255. The series of buffers 241, 243, 245, and 247 and egress areas 249, 251, 253, and 255 are selected by the switch 217 based on class of service. The egress unit 239 is coupled to output data links and data is communicated from these output data links to a node designated by the switch 217.

At the switch 217, data is received from the ingress unit 201 and a decision is made to route the data to a particular node. Further functions such as quality of service ("QOS") may be determined by switch 217. Each trunk coupled to the ATM switch 217 has a bandwidth capacity allocated to it. Switch 217 is coupled to a trunk and has a control plane and a data plane. The data plane can accommodate a fixed capacity of bandwidth that a trunk may carry. Thus, the amount of data that can be accommodated in a data plane of ATM switch 217 depends upon the size of the trunk coupled to the ATM switch.

Figure 3:
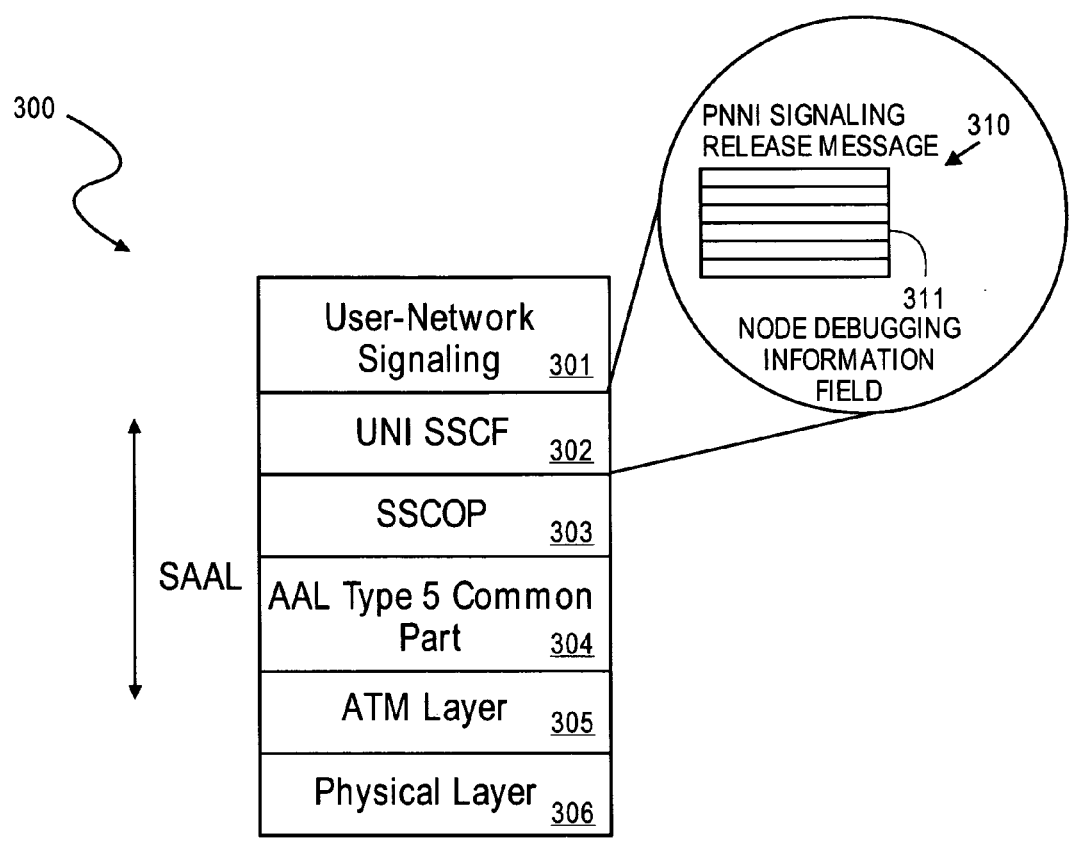
FIG. 3 is a diagram of an ATM signaling protocol stack in which embodiments of the present invention can be implemented.

FIG. 3 is a diagram of an ATM signaling protocol stack 300 in which embodiments of the present invention can be implemented. The ATM signaling protocol stack 300 is used for signaling information between nodes and users of an ATM network in accordance with various embodiments of the present invention. Types of information exchanged in an ATM network may include requests for use of network resources, signaling messages, bandwidth allocation factors, and circuit parameters for establishing a SVPC between two users.

The ATM signaling protocol stack 300 includes several protocols for connection control signaling, such as User-Network Signaling 301, User Network Interface Service Specific Coordination Function ("UNI SSCF") 302, Service Specific Connection-Oriented Protocol ("SSCOP") 303, ATM Adaptation Layer ("AAL") Type 5 Common Part 304, ATM Layer 305, and a Physical Layer 306. These protocols are sent over a Signaling ATM Adaptation Layer ("SAAL") to ensure reliable delivery. The SAAL is divided into two parts—namely, a Service Specific Part and a Common Part.

The ATM layer 305 in the ATM signaling protocol stack 300 is used for establishing connections between ATM nodes of a network. The physical layer 306 in the ATM network has several functions, including frame generation, cell delineation, and bit-level transmission.

The Service Specific Part of the SAAL of the ATM signaling protocol stack 300 includes User-Network Signaling 301, UNI SSCF 302 and SSCOP 303. The User-Network Signaling 301 includes PNNI signaling information (e.g. PNNI Signaling Release Message 310).

As described above, PNNI is a hierarchical dynamic link state routing protocol. PNNI signaling protocol comprises procedures to dynamically establish, maintain, and clear ATM connections at a private network-to-network interface or a network node interface between two ATM networks or two ATM network nodes. The PNNI signaling protocol is based on the ATM Forum UNI specification and on the International Telecommunications Union ("ITU") Q.2931 specification, but there are some differences between PNNI and the UNI specification and Q.2931.

The UNI/PNNI signaling protocols interface with users of the SSCF protocol and SSCOP for reliable delivery of cells to users of a digital network. The UNI/PNNI protocols perform network signaling functions such as call establishment, call clearing, and negotiation and allocation of bandwidth. UNI/PNNI signaling may also be used to perform network signaling functions.

The PNNI signaling message types include connection establishment messages, such as SETUP and ADD-PARTY as well as connection failure messages, such as RELEASE, RELEASE COMPLETE, DROP-PARTY, and ADD PARTY REJECT.

The SETUP and ADD-PARTY PNNI signaling messages are sent by the calling user to the network and by the network to the called user to setup a connection or add a party to an existing connection, respectively.

The RELEASE, RELASE COMPLETE, DROP-PARTY, and ADD PARTY REJECT PNNI signaling messages are sent by the failure node to the source node to indicate a connection (entirely or in respect to an additional party) is not established.

For one embodiment, the PNNI signaling protocol SETUP message includes a NDI functionality enabling command. A source node transmits such a SETUP message to a destination node. When a connection failure occurs at some intermediate node, the NDI functionality is enabled at the intermediate failure node. In response, the failure node transmits a connection failure message containing NDI to the source node. For one embodiment of the invention, the RELEASE message 310, shown in FIG. 3, includes a NDI field 311.

Figure 4:
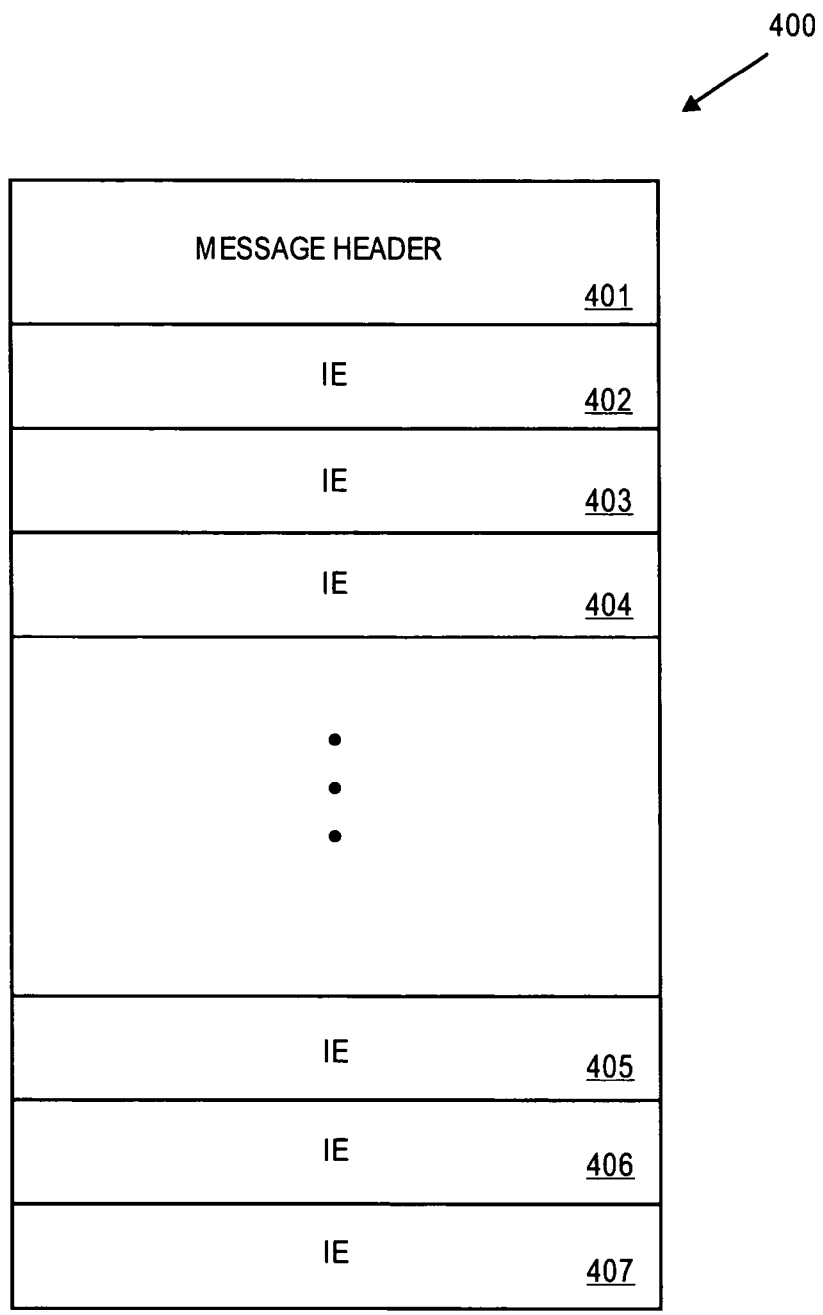
FIG. 4 illustrates the structure of a PNNI signaling message.

FIG. 4 illustrates the structure of a PNNI signaling message 400. The PNNI signaling message 400 is comprised of a message header 401 and a variable number of Information Elements ("IEs") 402 through 407. Although six IEs are shown in FIG. 4, more or fewer IEs could also be part of the PNNI signaling message 400.

The message header 401 contains information regarding the PNNI signaling message, such as a protocol discriminator, a call reference value, a message type, and a message length. For one embodiment, the message header 401 is 8 bits wide and contains a plurality of octets.

The SETUP message type is included in message header 401 for a SETUP PNNI signaling message. The RELEASE message type is included in message header 401 for a RELEASE PNNI signaling message.

The PNNI signaling message 400 includes information elements 402–407. There are several types of information elements. Some may appear only once in the message. Others may appear more than once. Depending on the message type, some information elements are mandatory and some are optional. The order of the information elements does not matter to the signaling protocol. Information elements include, but are not limited to, call state, connection identifier, quality of service parameter, calling party number, called party number, etc. For one embodiment, each of the information elements 402–407 is 8 bits wide and contains a plurality of octets.

For one embodiment of the invention, an NDI field is transported between network nodes in a PNNI signaling RELEASE message. In particular, for one embodiment, the actual NDI is encoded and the encoded NDI is transported in a Generic Application Transport ("GAT") information element ("IE") that is part of the PNNI signaling RELEASE message. The GAT mechanism is an interoperable method for transporting non-PNNI native information in PNNI networks.

Figure 5:
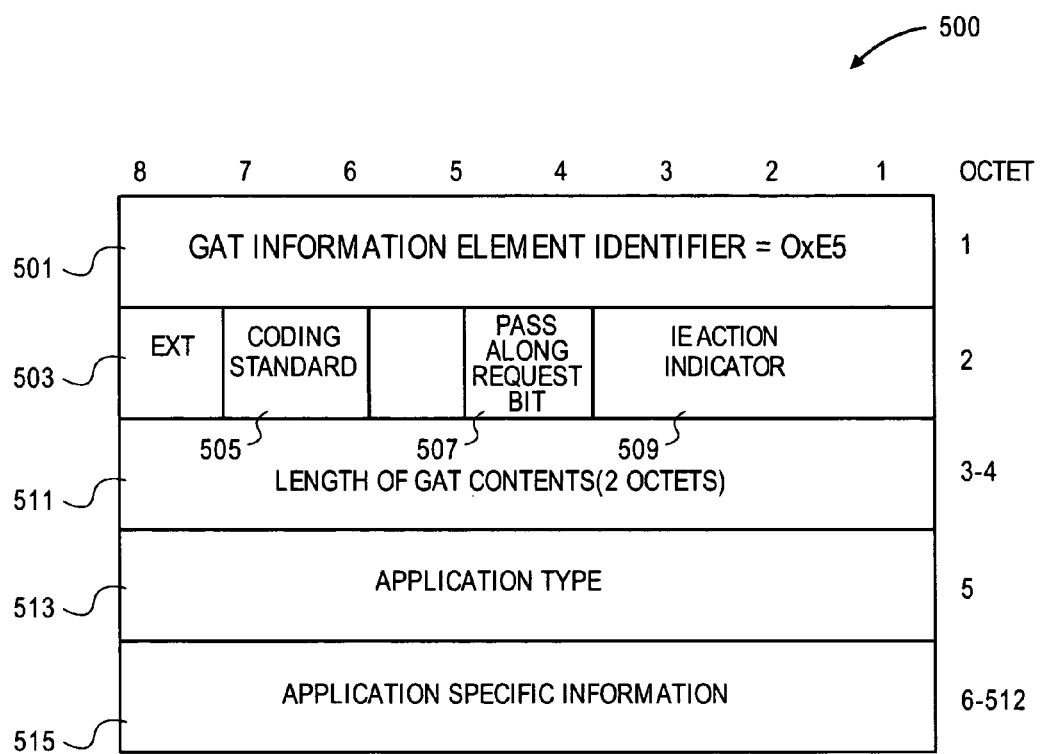
FIG. 5 illustrates a generic application transport information element that can contain a field containing node debugging information.

FIG. 5 relates to the embodiment of the invention wherein the NDI field is transported in a GAT IE 500 that is part of a PNNI RELEASE signaling message. The GAT IE 500 would be one of the information elements 402 through 407 (shown in FIG. 4) used in a PNNI RELEASE signaling message as described in reference to FIG. 4.

The GAT IE 500 is 8 bits wide and has up to 512 octets. The GAT IE 500 includes a GAT IE identifier 501, an extension field 503, a coding standard 505, a pass along request bit 507, an IE action indicator 509, a length field 511, an application type field 513, and application specific information 515.

The GAT IE identifier 501 allows a node to recognize the information being sent in the packet 500 and is in the first octet field of the GAT IE 500.

Coding standard 505 specifies the type of coding used to format the GAT IE 500. The pass along request bit 507 allows a node to pass along the GAT IE 500 instead of dropping the IE 500 if the node receiving the GAT IE 500 does not recognize the GAT IE 500. For example, GAT IE 500 may be coded such that an ATM network node that does not support or understand the GAT IE 500 will not reject the GAT IE 500, but instead will simply pass the GAT IE 500 along to the next ATM network node in the transmission path.

The IE action indicator 509 suggests the actions that may be taken by a node receiving the GAT IE 500, when the contents of the GAT IE 500 have errors. If the contents of the GAT IE 500 does not have errors, the node does not consider the IE action indicator. Extension 503, coding standard 505, pass along request bit 507, and IE action indicator 509 are in the second octet of GAT IE 500.

The GAT IE 500 also includes a field 511 for length of the GAT contents, an application type field 513, and an application specific information field 515. The GAT field 511 occupies the third and fourth octets. The application type field 513 is the fifth octet of IE 500. The application type field 513 can be organization specific and is coded as Øx Ø1. The application specific information field 515, which occupies octets 6 through 512, may include specific information requested or desired by the users of the network, including the node debugging information field in accordance with an embodiment of the present invention.

Figure 6:
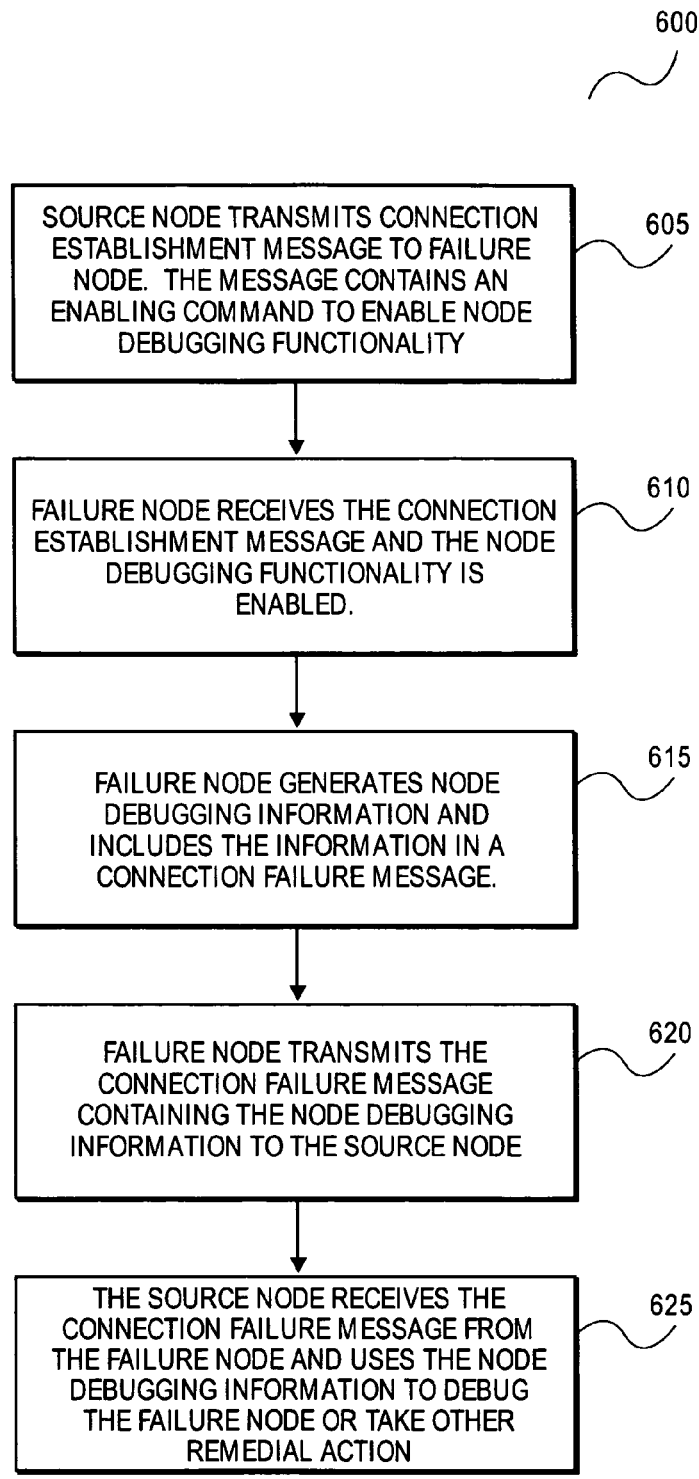
FIG. 6 is a process flow diagram in accordance with one embodiment of the present invention.

FIG. 6 is a process flow diagram in accordance with one embodiment of the present invention. Process 600 begins with operation 605 in which a connection establishment message is transmitted from a source node to an undetermined intermediate node of a failed connection (i.e., a failure node). Prior to operation 605 a connection establishment message was transmitted from a source node, through one or more intermediate nodes to a destination node, but at some node along the path the connection failed. For one embodiment, the connection establishment message may be a PNNI SETUP or ADD-PARTY message. The connection establishment message contains a NDI enabling command (e.g., contained in a GAT IE of the SETUP message) that enables inclusion of NDI in a subsequent connection failure message from the failure node to the source node.

At operation 610 the connection establishment message is received at the failure node and the NDI functionality of the failure node is enabled. For alternative embodiments, the NDI functionality may be enabled through other means or may be permanently enabled. That is, the NDI functionality need not be enabled through a command contained in a connection establishment message.

At operation 615, software, implemented on the failure node as part of the NDI functionality, generates and analyzes node debugging information. Failure node identification, cause of failure, specific problematic software modules and lines of code, as well as recommended corrective procedures may be generated as NDI.

At operation 620 the NDI is transmitted with a connection failure message to the source node for use in node debugging. In various embodiments, the NDI is encoded and placed within a GAT IE of the NDI field contained within a PNNI RELEASE, RELEASE COMPLETE, DROP-PARTY, or ADD PARTY REJECT message, and thereby transmitted to the source node for debugging.

At operation 625, the NDI is received at the source node and used to effect debugging of the failure node or take other remedial action in regard to the failed connection. Thus, network node debugging is efficiently and timely accomplished.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   including node debugging information in a connection failure message of a signaling protocol only after receipt of an enabling command which enables the inclusion of the node debugging information in the connection failure message, the connection failure message indicating a failed connection through a network having a plurality of nodes wherein connections are established between a source node and a destination node, through one or more intermediate nodes; and
   forwarding the connection failure message to a source node of the failed connection.

2. The method of claim 1, wherein the node debugging information and the connection failure message is generated at a failure node.

3. The method of claim 2, wherein the signaling protocol is PNNI and the connection failure message is a PNNI signaling message containing a general application transport (GAT) information element (IE) and the node debugging information is included in the GAT IE.

4. The method of claim 3, wherein the node debugging information is encoded prior to being included in the GAT IE.

5. The method of claim 3, wherein the PNNI signaling message is a RELEASE message.

6. The method of claim 1, wherein the node debugging information includes at least one of: a failure node identification, a cause of failure, references to specific problematic software modules and lines of code, and a corrective procedure.

7. The method of claim 2, wherein the node debugging information is generated at the failure node only after receipt at the failure node of a connection establishment message containing the enabling command.

8. A network switch, comprising:
   a processor to automatically determine node debugging information for a failure node of a failed network connection and include the node debugging information within a connection failure message of a signaling only after receipt of an enabling command which enables the inclusion of the node debugging information within the connection failure message, the connection failure message forwarded from the failure node to a source node.

9. The network switch of claim 8, wherein the signaling protocol is PNNI and the connection failure message is a PNNI signaling message containing a general application transport (GAT) information element (IE) and the node debugging information is included in the GAT IE.

10. The network switch of claim 9, wherein the node debugging information is encoded prior to being included in the GAT IE.

11. The network switch of claim 9, wherein the PNNI signaling message is a RELEASE message.

12. The network switch of claim 8, wherein the node debugging information includes at least one of: a failure node identification, a cause of failure, references to specific problematic software modules and lines of code, and a corrective procedure.

13. The network switch of claim 8, wherein the node debugging information is generated at the failure node only after receipt at the failure node of a connection establishment message containing the enabling command.

14. A network system comprising:
   means for including node debugging information in a connection failure message of a signaling protocol, wherein the node debugging information includes references to specific problematic software modules or lines of code, the connection failure message indicating a failed connection through a network having a plurality of nodes wherein connections are established between a source node and a destination node, through one or more intermediate nodes; and
   means for forwarding the connection failure message to a source node of the failed connection.

15. The network system of claim 14 further comprising:
   means for generating the node debugging information and the connection failure message at a failure node.

16. The network system of claim 15, wherein the signaling protocol is PNNI and the connection failure message is a PNNI signaling message containing a general application transport (GAT) information element (IE) and the node debugging information is included in the GAT IE.

17. The network system of claim 16 further comprising:
   means for encoding the node debugging information prior to including the node debugging information in the GAT IE.

18. The network system of claim 17, wherein the PNNI signaling message is a RELEASE message.

19. The network system of claim 14, wherein the node debugging information includes a failure node identification, a cause of failure, and a corrective procedure.

20. The network system of claim 14, wherein the node debugging information is generated at the failure node only after receipt at the failure node of a connection establishment message containing an enabling command, the enabling command enabling the inclusion of the node debugging information within a connection failure message.

21. A machine-readable medium that provides executable instructions, which when executed by a processor, cause the processor to perform a method, the method comprising:
  including node debugging information in a connection failure message of a signaling protocol, wherein the node debugging information includes references to specific problematic software modules or lines of code, the connection failure message indicating a failed connection through a network having a plurality of nodes wherein connections are established between a source node and a destination node, through one or more intermediate nodes; and
  forwarding the connection failure message to a source node of the failed connection.

22. The machine-readable medium of claim 21, wherein the node debugging information and the connection failure message is generated at a failure node.

23. The machine-readable medium of claim 22, wherein the signaling protocol is PNNI and the connection failure message is a PNNI signaling message containing a general application transport (GAT) information element (IE) and the node debugging information is included in the GAT IE.

24. The machine-readable medium of claim 23, wherein the node debugging information is encoded prior to being included in the GAT IE.

25. The machine-readable medium of claim 23, wherein the PNNI signaling message is a RELEASE message.

26. The machine-readable medium of claim 21, wherein the node debugging information includes a failure node identification, a cause of failure, and a corrective procedure.

27. The machine-readable medium of claim 22, wherein the node debugging information is generated at the failure node only after receipt at the failure node of a connection establishment message containing an enabling command, the enabling command enabling the inclusion of the node debugging information within a connection failure message.

* * * * *